United States Patent Office 2,863,859
Patented Dec. 9, 1958

2,863,859

BIS-(TRIAZOLYL)-AZO DYES

Randolph Norris Shreve, West Lafayette, Ind., and Robert Koridon Charlesworth, Walnut Creek, Calif., assignors, by mesne assignments, to Research Corporation, New York, N. Y., a corporation of New York No Drawing. Application August 9, 1954
Serial No. 448,756

3 Claims. (Cl. 260—157)

This invention relates to certain novel dyestuff materials and is more particularly concerned with a diazo type of material having a bis-(triazolyl)-alkylene center structure wherein triazolyl carbon atoms are attached to conventional dye coupling agents. More specifically, the compounds of the present invention have the following formula:

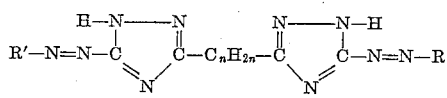

wherein $n$ is an integer from zero to twelve, inclusive, and wherein R and R' are the residues of substituted aryl radicals capable of coupling.

It is a primary object of the present invention to provide a novel series of dyestuffs. Another object of the present invention is to provide a novel series of dyestuffs which have active hydrogen atoms capable of forming a mordant. Still another object of the present invention is to provide a novel series of dyestuffs having applicability to a large variety of fabrics. Further, it is an object of the present invention to provide a series of dyestuffs having a wide variation of colors which may be applied to most fabrics by conventional dyeing techniques. Other objects will become apparent hereinafter.

In a copending application, Serial 396,344, filed December 4, 1953, now U. S. Patent 2,744,116, of which this application is a continuation-in-part, there is described a novel group of bis-triazolyl alkanes having the following structure:

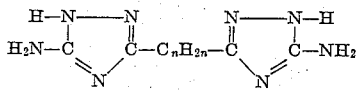

wherein $n$ is an integer from zero to twelve, inclusive.

The process of the present invention comprises the reaction of this novel intermediate material with coupling agents to form the dyestuffs of the present invention. Representative coupling materials which are suitable in the process of the present invention, include, for example, 3-methyl-1-phenyl-5-pyrazolone, Koch's acid, Chicago acid, ortho-nitrophenol, salicylic acid, R and G acid, alpha- and beta-naphthol, meta-phenylenediamine-sulfonic acid, crocein, Laurent's acid, Neville and Winther's acid, dimethylaniline, barbituric acid, hydroquinone, phluoroglucinol, catachol, Broener's acid, alpha- and beta-naphthylamine, H-acid, J-acid, para-nitroaniline, phenol, chlorobenzene, et cetera, that is, an aromatic material capable of coupling, containing an activated hydrogen atom, and substituted on the aromatic moiety at least once. Of course, previously diazotized materials are suitable, such as J-acid which has been coupled with alpha-naphthylamine and still retains an activated hydrogen atom on at least a part of the aromatic moiety contained within the molecule. Suitable coupling materials for the process of the present invention to prepare the product of the present invention are well known in the art and with the aid of the foregoing list will be apparent to those skilled in the art.

The reaction is usually accomplished by dissolving the bis-triazolyl intermediate in an acid solution and cooling this solution to a temperature below that at which the bis-triazolyl salt material crystallizes from solution. This temperature will usually be below about twenty degrees centigrade, and probably about ten degrees centigrade, depending upon the particular concentration of the acid employed. Thus, concentrations between about two and about thirty percent of acid are satisfactory, usually, a ten percent acid solution is used. Various acids are suitable, including, for example, sulfuric, nitric, hydrochloric, sulfamic, acetic, et cetera, however, sulfuric acid is preferred because of its availability and non-interference in an aqueous solution with reaction components, the reaction, or the reaction products.

When this salt has precipitated, a solution of sodium nitrite is added to the precipitated amine solution. Preferably, this sodium nitrite is added while cold, below about twenty degrees centigrade, usually about ten degrees centigrade. The concentration of the sodium nitrite may vary anywhere from one to thirty or forty percent, however, a twenty percent solution is preferred. Normally, the sodium nitrite is employed in substantially twice the molar quantity of sodium nitrite as the amine that is employed, since there are two reactive groups on the amine which are subject to diazotization. By stirring, or other agitation, while maintaining the reaction mixture cold, the solids will go into solution. This will signify an end of the reaction period, and usually takes between five and thirty minutes, depending on the degree of agitation, the temperature and the particular reactants.

After the diazotized salt has been prepared the coupling agent is added to the solution. Preferably, the coupling agent is suspended in water, or a miscible organic solvent such that reaction can occur in the water, and the coupling solution is added relatively slowly to insure a substantially uniform reaction rate. The amount of coupling reagent which is employed is two molar times that of the bis-triazolyl amine which is originally employed, since there are two reactive groups on each of the bis-triazolyl amine molecules. The molar quantity of the coupling agent will be substantially the same as the molar quantity of the sodium nitrite which is employed. However, it is to be understood that excesses of the sodium nitrite or coupling agent may be employed without seriously hindering the results.

The period for addition of the coupling agent will depend on the amount of reaction components, the degree of reaction time involved, and the reaction products which are prepared. Generally speaking, the dye thus-prepared will precipitate from the reaction mixture, however, if it does not precipitate per se by adjusting the pH in a conventional manner, precipitation of the dye may be accomplished, by the addition of an organic solvent. Also, conventionally, by utilizing the alkaline H-acid test, it can be determined whether the reaction is substantially complete.

The dye thus-precipitated is separated by filtration, centrifugation, or decantation, in conventional manner, and recovered.

Various testing procedures are available for determining the amount of pure dye in the dyestuff material thus-prepared are known in the art, however, we have found that results will vary from sixty percent and the theoretical yield based on the bis-triazolyl amine employed as the starting material in the use of pure dyes.

After separation of the pure dye, it can be dried and applied to fabrics in conventional manner, with or without a mordant, as desired. The active hydrogen atoms on the triazolyl center moiety are subject to mordanting.

The following examples are given to illustrate the process and products of the present invention, but are not to be construed as limiting.

*Example 1*

One (1.0) part of 3-tetramethylene-bis-(5-amino-1,2,4-triazole) was dissolved in 12.5 parts of ten percent sulfuric acid, with the use of a slight amount of heat. The resulting solution was cooled to five degrees centigrade in an ice bath. The sulfate of the amine precipitated upon stirring. To the resulting suspension was added a cold, twenty percent solution of 0.63 part of sodium nitrite in water. At the end of ten minutes, with stirring, all of the solids had gone into solution. To this diazonium salt solution was added a suspension of 1.7 parts of meta-phenylenediaminesulfonic acid in 25 parts of water. This addition was carried out portionwise over a period of forty-five minutes. After stirring an additional fifteen minutes, a negative test with alkaline H-acid was obtained, so the solution was filtered with suction and a Büchner funnel and dried at 55 degrees centigrade. There was thus obtained thirteen parts, corresponding to 71.7 percent of the theoretical yield based on the bis-triazolyl employed, of a dye having the following structure:

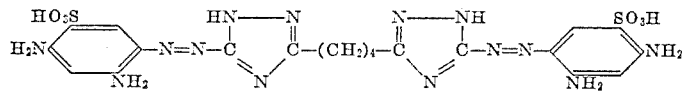

*Example 2*

The process of Example 1 was repeated, except that 1.1 part of dimethylaniline in 25 parts of water containing four grams of sodium acetate was utilized as the coupling agent. The mixture was tested for completion of the reaction with alkaline H-acid. There was thus obtained 1.0 part of pure dye representing 58.8 percent of the theoretical yield based on the bis-triazole employed as starting material.

*Example 3*

The process of Examples 1 and 2 was employed, except that 1.24 parts of salicylic acid in fifty parts of water containing five parts of anhydrous sodium carbonate was employed as the coupling agent. The determination of the reaction was accomplished without H-acid. After filtration in a Büchner funnel, the residue was acidified with fifty percent sulfuric acid. The resulting mixture was filtered, and the residue dried at 55 degrees centigrade. There was thus obtained a yellow dyestuff containing 1.05 parts of pure dye corresponding to 44.8 percent of the theoretical yield based on the bis-triazole employed.

*Example 4*

A mixture of 1.38 parts of para-nitroaniline in three parts of 37.5 percent concentrated hydrochloric acid in three parts of water was cooled with five parts of water and five parts of ice. The hydrochloride of the amine precipitated. When the temperature of the mixture had reached five degrees centigrade, 3.5 parts of a cold solution containing twenty percent sodium nitrite was added. After a few minutes, all solids had dissolved and tests with Congo red and starch iodide paper indicated complete diazotization. To the resulting solution was added over a 45-minute period a solution of 3.41 parts (0.01 mole) of H-acid in 25 parts of water containing 0.55 part anhydrous sodium carbonate. After ten minutes a drop of the reaction mixture failed to react with alkaline H-acid. The mixture was worked at five degrees centigrade for two and one-half hours, and then allowed to come to room temperature slowly. It was allowed to set at room temperature for twelve hours. The reddish-violet mixture is the coupled diazo compound of para-nitroaniline and H-acid, having the following structure:

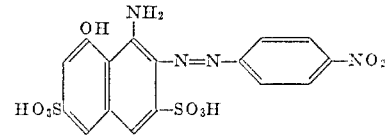

After heating this material to eighty degrees centigrade, ten parts of thirty percent sodium hydroxide and four parts of anhydrous sodium carbonate was added. Complete solution occurred, this solution having a bright blue color. The solution was then placed in an ice-bath and cooled to five degrees centigrade with stirring. To this cooled solution was added a cold solution of a tetrazotized triazole prepared as follows:

Two and twenty-two one-hundredths (2.22) parts of 3-tetramethylene-bis-(5-amino-1,2,4-triazole) was dissolved in 35 parts of ten percent sulfuric acid and cooled with stirring to five degrees centigrade. The resulting mixture was treated with a twenty percent solution of 1.38 parts of sodium nitrite in water. All solids dissolved. The tetrazotized triazole was added over a thirty minute period. A drop of the reaction mixture on filter paper gave a faint reaction with alkaline H-acid. The mixture containing the compound corresponding to the 3-tetramethylene-bis-(5-amino-1,2,4-triazole) coupled with the compound above formulized was then treated with 0.94 part of phenol in five parts of water. A drop of the green mixture failed to react with alkaline H-acid. The mixture was worked at five degrees centigrade for two hours and then allowed to come to room temperature with stirring. The mixture was allowed to stand for twelve hours. It was then treated with 25 parts of thirty percent sodium hydroxide at 85 degrees centigrade and fifteen parts of sodium chloride. The dye was precipitated with fifty percent sulfuric acid. This mixture was separated by filtering in a Büchner funnel and dried at 55 degrees centigrade. There was thus obtained a black powder containing 5.04 parts of pure dye corresponding to 60.9 percent of the theoretical yield based on the bis-triazole employed. This material had the formula:

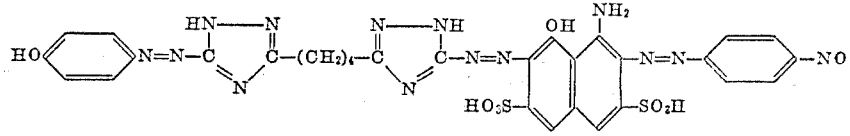

*Example 5*

In a manner similar to that of Example 4, para-chloroaniline was coupled with H-acid in anhydrous sodium carbonate. The blue solution which resulted after partial purification was cooled to five degrees centigrade with stirring over a thirty minute period, 0.01 mole of tetrazotized bis-triazole prepared as indicated above was added thereto. At the end of thirty minutes a spot of the red mixture gave a faint coloration with alkaline H-acid on filter paper. To the mixture was added 0.94 gram (0.1 mole) of phenol and ten milliliters of water. After ten minutes, a negative test with H-acid was obtained. The mixture was worked for 2.5 hours at five degrees centigrade and allowed to come to room temperature with stirring. It was set aside for twelve hours and then heated to 85 degrees centigrade. The hot mixture was treated with 25 milliliters of thirty percent sodium hydroxide and fifteen grams of sodium chloride. The dye was then precipitated with fifty percent sulfuric acid. Filtration was accomplished in a Büchner funnel to yield a black dyestuff, which, when dried at 55 degrees centigrade, contained 3.35 grams of pure dye corresponding to a 41 percent yield of the theoretical, based on the bis-triazole. This material has the formula:

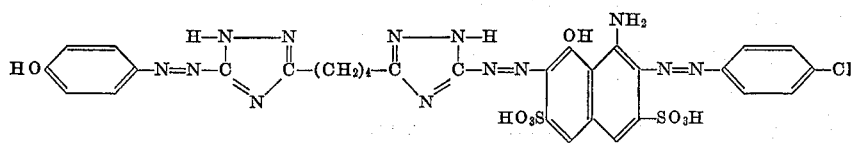

Example 6

In a manner similar to the foregoing examples, the following bis-azo dyes were prepared, utilizing the bis-triazolyl amine alkane as described above. In this case, for the purposes of convenience, the following chart recites those compounds prepared wherein the carbon chain between the triazolyl groups contains four carbon atoms:

| Name | Conditions | Color |
|---|---|---|
| m-Phenylenediamine sulfonic acid | Acidic | Orange. |
| Crocein scarlet | ...do | Red. |
| Laurent's acid | ...do | Brown. |
| Neville-Winther's acid | ...do [1] | Do. |
| Naphthol AS-BS | ...do [1] | Orange. |
| Naphthol AS-G | ...do [1] | Yellow. |
| Dimethylaniline | ...do [1] | Orange. |
| Barbituric acid | Basic | Yellow. |
| Hydroquinone | ...do | Brown. |
| Phluoroglucinol | ...do | Do. |
| Catechol | ...do | Do. |
| Broenner's acid | Acidic [1] | Orange. |
| alpha-Naphthylamine | ...do | Violet. |
| 3-Methyl-1-phenyl-5-pyrazolone | Basic | Yellow. |
| Koch's acid | ...do | Red. |
| Chicago acid | ...do | Brown. |
| R-acid | Acidic | Orange. |
| G-acid | ...do | Yellow. |
| o-Nitrophenol | ...do | Do. |
| Salicylic acid | Basic | Do. |

[1] Sodium acetate buffered.

The conditions referred to therein refer to the actual hydrogen ion concentration of the solution in which the coupling occurred. The column listed "Color" is the final color of the dis-azo dye prepared from the reagent specified under the condition specified.

Example 7

The following chart illustrates certain tris-azo dyes prepared from the bis-triazole of adipic acid, that is, 3-tetramethylene-bis-(5-amino-1,2,4-triazole), and wherein one coupling agent comprises a previously diazotized material. The preparation of the following tris-azo dyes was accomplished:

The above examples are shown with an alkylene bridge wherein $n$ equals 4. However, other alkylene bridges may be substituted for the tetramethylene of the examples, such as, for example, methylene, dimethylene, trimethylene, pentamethylene, hexamethylene, heptamethylene, octamethylene, nonamethylene, decamethylene, et cetera, as well as the bis-(5-amino-1,2,4-triazolyl). Additionally, it is to be understood that other coupling agents may be substituted for those of the examples.

By a proper selection of the coupling agents used to make the final dye, the color of the above dyes may be varied from red to violet, that is, across the whole of the visible spectrum. Certain varying color effects will also be accomplished by a proper selection of the reaction media employed, that is, whether it is basic, acidic, or neutral, or the particular pH employed.

The color fastness to light, to crocking, to laundering, to perspiration, et cetera, of the dyes of the present invention is comparable to the benzidine dyes. In general, the after-treatment with copper sulfate increases the color fastness of the dyes to light, crocking, laundering and perspiration. Of course, other metals than copper may be used as mordanting materials, and will have an effect on the color fastness. Apparently, the chain length of the alkylene bridge of the intermediate has little effect on either the color or the color fastness of the dye. The tris-azo and dis-azo dyes can be applied to Vicara (Virginia-Carolina Chemical Corporation—a synthetic fiber made from corn protein. It resembles wool in its properties and is used principally in blends with wool.), nylon, wool, cotton, viscose, rayon and silk with very satisfactory results.

Various modifications may be made in the present invention without departing from the spirit or scope thereof and it is to be understood that we limit ourselves only as defined in the appended claims.

We claim:

1. A dye having the formula

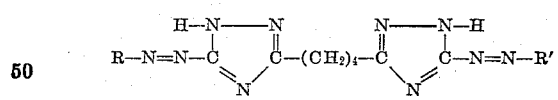

wherein R and R' are coupling components.

| Primary Diazotized Amine | Conditions | Primary Coupler | Conditions | Secondary Diazotized Amine | Conditions | Secondary Coupler | Color |
|---|---|---|---|---|---|---|---|
| 1. p-Nitroaniline | Acidic → | H-acid | ← Alkaline | Bistriazole | Alkaline → | Phenol | Green. |
| 2. alpha-Naphthylamine | Acidic → | J-acid | ← Alkaline | ...do | Alkaline → | ...do | Red. |
| 3. p-Nitroaniline | Acidic → | ...do | ← Alkaline | ...do | Alkaline → | o-Nitrophenol | Do. |
| 4. Aniline | Acidic → | H-acid | ← Alkaline | ...do | Alkaline → | Phenol | Violet. |
| 5. p-Aminophenol | Acidic → | ...do | ← Alkaline | ...do | Alkaline → | ...do | Blue. |
| 6. p-Chloroaniline | Acidic → | ...do | ← Alkaline | ...do | Alkaline → | ...do | Do. |

2. A dye having the formula:

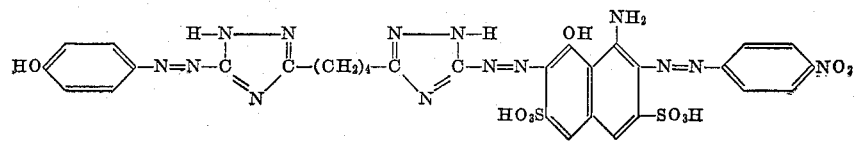

3. A dye having the formula:
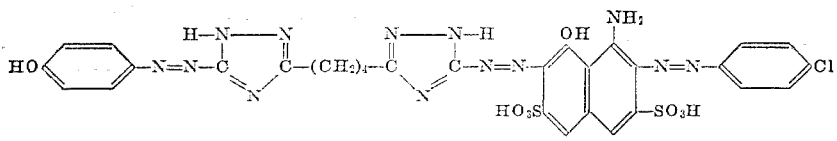
References Cited in the file of this patent
UNITED STATES PATENTS
| | | |
|---|---|---|
| 2,346,531 | Allen et al. | Apr. 11, 1944 |
| 2,432,419 | Heimbach | Dec. 9, 1947 |
| 2,490,967 | Kaiser | Dec. 13, 1949 |
| 2,671,775 | Hanhart | Mar. 9, 1954 |
| 2,744,116 | Shreve et al. | May 1, 1956 |
FOREIGN PATENTS
| | | |
|---|---|---|
| 173,521 | Austria | Dec. 27, 1952 |